US009292610B2

(12) United States Patent
Vyas et al.

(10) Patent No.: US 9,292,610 B2
(45) Date of Patent: Mar. 22, 2016

(54) LOCATION IDENTIFICATION USING HIERARCHICAL NATURE OF GEOGRAPHIC LOCATIONS

(71) Applicant: Google Inc., Mountain View, CA (US)

(72) Inventors: Jayesh Vyas, Mountain View, CA (US); Piyush Prahladka, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 120 days.

(21) Appl. No.: 14/089,375

(22) Filed: Dec. 24, 2013

(65) Prior Publication Data

US 2014/0304258 A1    Oct. 9, 2014

Related U.S. Application Data

(60) Provisional application No. 61/810,200, filed on Apr. 9, 2013.

(51) Int. Cl.
*G06F 17/00* (2006.01)
*G06F 17/30* (2006.01)

(52) U.S. Cl.
CPC .................... *G06F 17/3087* (2013.01)

(58) Field of Classification Search
CPC ............... G06F 17/30247; G06F 17/30265; G06F 17/30867; G06F 17/30241; G06F 17/3087
See application file for complete search history.

(56) References Cited

U.S. PATENT DOCUMENTS

2007/0198495 A1*  8/2007  Buron et al. ................ 707/3

OTHER PUBLICATIONS

U.S. Appl. No. 11/781,860, entitled "Locale Identification for Domains and Domain Content Background," filed Jul. 23, 2007.

* cited by examiner

*Primary Examiner* — Truong Vo
(74) *Attorney, Agent, or Firm* — Dority & Manning, P.A.

(57) ABSTRACT

Systems and methods for location identification are provided. Hierarchical organization of geographic regions is utilized to determine if a document targets a particular location.

20 Claims, 2 Drawing Sheets

LOCATION IDENTIFICATION USING HIERARCHICAL NATURE OF GEOGRAPHIC LOCATIONS

PRIORITY CLAIM

This application claims the benefit of priority of U.S. Provisional Patent Application Ser. No. 61/810,200 filed on Apr. 9, 2013, which is incorporated herein by reference for all purposes.

FIELD

The present disclosure relates generally to systems and methods for location identification using hierarchical nature of geographic locations.

BACKGROUND

A search service, e.g., a web-based search service, will generally receive a search query from a user through a user interface presented to the user by the service through a web browser on a computing device. Upon receiving a search query, a search service will generally direct the search query to a search engine for a specific corpus of resources. A search engine produces results based on the query. The search engine initially ranks the results according to one or more criteria including the relevance of the results to the query in the context of the corpus to which the query was directed. After the search engine produces the results, the search service presents those search results to the user.

Location information for documents in search results can be utilized to improve results that are presented to a user. Geotagging is a process of adding geographical identification metadata to various media, including web documents. Geotagged documents in search results can be leveraged to, for example, promote documents in search results for users located in a location associated with the documents, or to demote documents in search results for users in other locations. Location identification that can leverage the hierarchical nature of geographic locations would be particularly useful.

SUMMARY

Aspects and advantages of the invention will be set forth in part in the following description, or may be obvious from the description, or may be learned through practice of the invention.

One exemplary aspect of the present disclosure is directed to a computer-implemented method of location identification. The method includes identifying a document. A first score is calculated for each of two or more first geographic regions. Each first score is based on one or more first signals, the one or more first signals providing a measure of inferred association between the document and each of the first geographic regions. A second score is calculated for each of two or more second geographic regions. The second geographic regions are contained within one of the first geographic regions. Each second score is based on one or more second signals, the one or more second signals providing a measure of inferred association between the document and each of the second geographic regions.

Other exemplary aspects of the present disclosure are directed to systems, apparatus, non-transitory computer-readable media, and user interfaces, for location identification.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
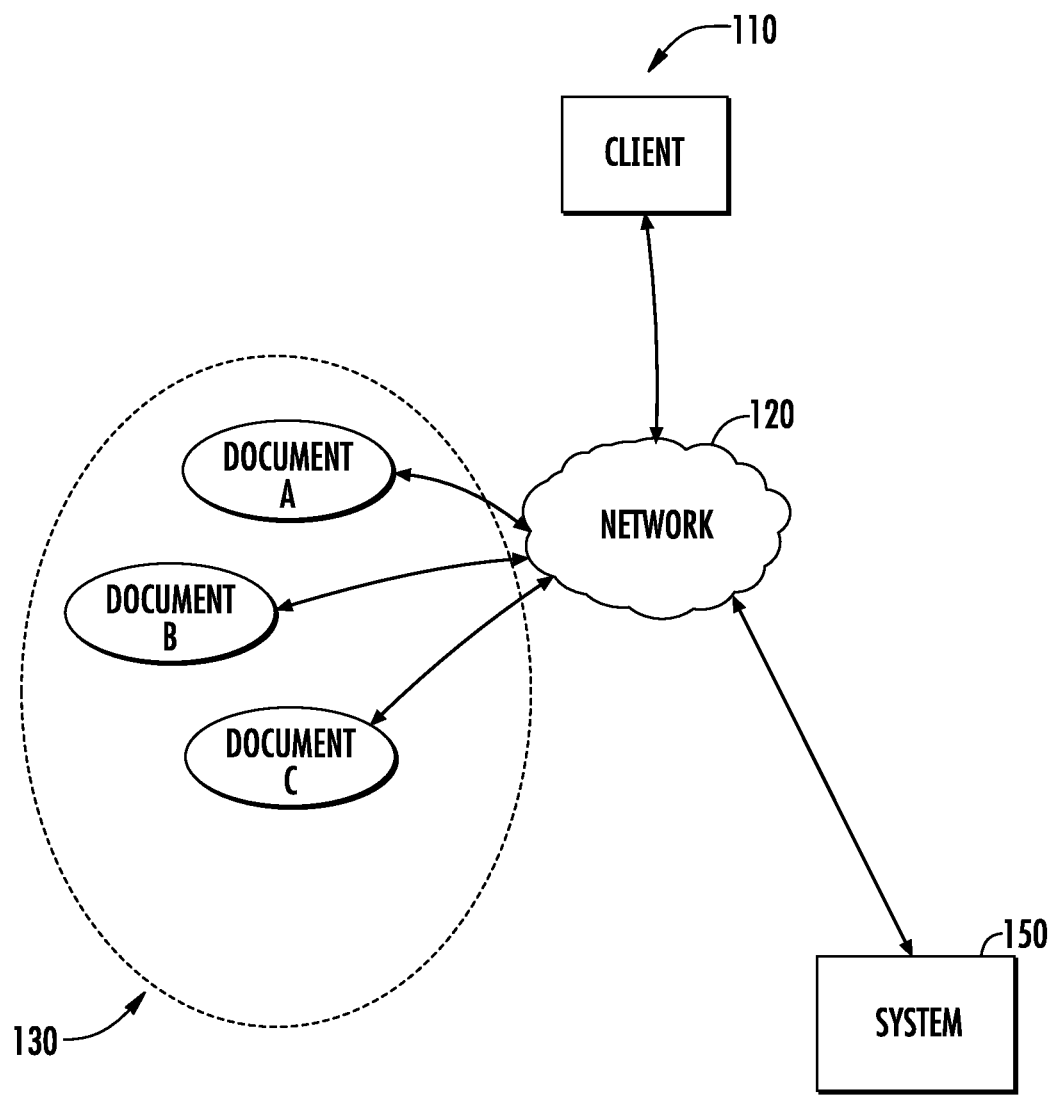
FIG. 1 depicts an exemplary block diagram of a system according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to utilization of the hierarchical nature of geographic locations to detect if a document is associated with a particular geographic region and, if so, which geographic region the document is associated with. In this manner, documents can be classified into one or more larger geographic regions with the classification being iteratively refined to identify the smallest geographic region that the document is targeted for.

According to a particular implementation of the present disclosure, scores can be calculated for geographic regions using one or more signals. For example, one or more countries that are associated with a document can be identified from multiple countries based on calculated scores from one or more signals. Once one or more countries have been identified, subregions of each of the identified one or more countries, such as one or more states or provinces within each respective country, can be further identified based on scores calculated for the subregions using one or more signals. Similarly, if one or more states or provinces are identified, a further subregion such as one or more counties within each respective state or province can be identified based on county level scores. If one or more counties are identified, a still further subregion can be identified such as one or more cities within each respective county. Geotagging can be utilized to associate geographic information metadata with documents, e.g., in a geo-referenced document index, based upon the iterative classification.

In this manner, exemplary implementations of the present disclosure can be utilized to not only identify the correct geographic area associated with a document, but also the correct granularity of the geographic area, such as the city, county, state, or country associated with the document.

Referring to FIG. 1, a block diagram is illustrated with an overview of an exemplary system 150 connected to a network 120. The system 150 can be, e.g., a web server module that includes a search engine system. The network 120 can include one or more networks. The system 150 communicates with a client 110 over the network 120. Although only one client 110 and one system 150 are illustrated in FIG. 1, any suitable number of clients 110 and systems 150 may be connected through the network 120.

It will be appreciated that the term "module" refers to computer logic utilized to provide desired functionality. Thus, a module can be implemented in hardware, firmware and/or software controlling a general purpose processor. In one embodiment, the modules are program code files stored on the storage device, loaded into memory and executed by a processor or can be provided from computer program products, for example, computer executable instructions that are stored in a tangible computer-readable storage medium such as RAM, hard disk, or optical or magnetic media.

The system 150 can be implemented using a computing device and can include a processor and a memory. The memory can store instructions which cause the processor to perform operations. The system 150 can access a number of documents 130 over network 120.

In general, documents 130 include any number or types of objects that are addressable over a network, e.g., web pages, electronic documents, images, sounds, videos, applications, document names, text, metadata, and the like. The objects can be dynamic (e.g., dynamic web pages). Alternatively, the objects can be static (e.g., PDF documents).

Each of the documents 130 may be relevant to one or more locations. Locations correspond to geographic regions. As described herein, geographic regions are hierarchical in nature such that association of a document with a larger region (e.g., a country) can be iteratively refined to arrive at the smallest region that the document is associated with. For instance, any formal or informal subdivision of a country (e.g., state, zone, province, county, city, municipality, district, etc.) can be identified in sequence after the preceding larger region is identified (i.e., city can be identified after county). In other implementations, locations also include groups of countries (e.g., political unions of countries, groups of countries having a common cultural heritage, countries within a particular area, etc.) wherein subsets of such locations can be identified in sequence as the classification is refined.

One or more signals can be utilized to calculate a score for each geographic region relevant to a document at a highest hierarchical level. Geographic regions having high scores can be identified and associated with the document. Next, a subset of the one or more signals (i.e., those corresponding to the identified geographic regions) can be used to score subregions of the geographic regions. For instance, once one or more countries have been identified, signals from the identified one or more countries can be used to score subregions (e.g., states) of the one or more identified countries. Subregions having high scores can be identified and associated with the document.

Each of the documents 130 can include one or more signals that system 150 uses to identify one or more locations relevant to the document. Signals can include dynamic information relating to, e.g., user interaction information, or web traffic information. In some implementations, the system 150 examines user click data to identify locations. For example, the system 150 can identify locations corresponding to the locations of users clicking on a particular document presented in search results. The system 150 can also explicitly ask users to provide location information.

In situations in which the systems discussed here collect personal information about users, or may make use of personal information, the users may be provided with an opportunity to control whether programs or features collect user information (e.g., information about a user's location, actions or activities, or a user's current location). In addition, certain data may be treated in one or more ways before it is stored or used, so that personally identifiable information is removed. For example, location information received from a user may be stored without reference to the particular user from which the information was obtained, a user's identity may be treated so that no personally identifiable information can be determined for the user, or a user's geographic location may be generalized (such as to a city, ZIP code, or state level), so that a particular location of a user cannot be determined. Thus, the user can have control over how information is collected about the user, stored, and used.

Signals can also include content information associated with a document. In some implementations, the system 150 examines anchor text in a document and identifies locations associated with documents the anchor text links to. In other implementations, the system 150 detects locations identified by metadata or tags in a document. In other implementations, the system 150 detects locations identified by the URL of the document.

In still other implementations, the system 150 detects keywords in a document explicitly identifying locations. The system 150 can detect proper nouns in a document explicitly identifying locations (the system 150 could interpret the keywords "Paris" and "France," for example, as explicitly identifying the location of France). The system 150 can also detect capitalized words in document text and compare those words to an index containing proper nouns typical of a particular location (e.g., common last names, landmarks, and holidays). The system 150 can also detect keywords in a document that are characteristic of a location. For example, the system 150 can maintain an index of terms characteristic of particular locations (e.g., "tea," "queen," and "beefeater" can be characteristic keywords for the U.K.) and can determine that a document containing a threshold number of characteristic keywords for a location is relevant to that location.

The system 150 can calculate values for the signals that signify the strength with which the signal identifies a particular location. The system 150 can adjust signal values to account for, e.g., the reliability or quality of the signal information. Signal values can be scaled relative to other signals in the same document, and can be normalized.

Documents can be relevant to a region, i.e., a particular grouping of two or more locations, and can be assigned regional location scores. Regions can be defined according to various different criteria. In some implementations, the system 150 defines regions to include locations grouped according to geography. In other implementations, the system 150 defines regions according to political associations. The system 150 can define a NAFTA region including locations corresponding to the U.S., Canada, and Mexico, and can assign documents NAFTA scores if, for example, the documents have location scores for one of the three NAFTA countries or include documents with content relating to NAFTA developments.

Scores for a document indicate the degree to which that document is relevant to a particular location, as established by the signals of the document. If the signals show a strong association between the document and a location, the document will have a relatively high score for that location. A document can be assigned separate location scores for each location identified by a signal. Alternatively, a document can be assigned location scores for only select locations. For example, a document can be assigned a location score only if the document satisfies a threshold degree of relevance to the location or if the signals identifying the location satisfy a threshold level of reliability.

The client 110 is used by one or more users. The users use one or more applications on the client 110 in order to communicate with the system 150 and the documents 130. For example, the user on the client 110 can use a web browser application to submit a search query to a search engine. The user receives results to the search query from the system 150. The user can select one or more of the received results and can address associated content (e.g., by clicking on a link contained in the result).

In certain implementations, locations in user search queries which lead to clicks on documents can be utilized as a signal by system 150. Such a signal can be a strong indication that a document is associated with a location in a query.

Users can be associated with a location. The user's location can be any geographic location in which the user is likely to be physically located or in which the user is likely to be interested. The system 150 can infer the user's location from information associated with or provided by the user. For example, the system 150 can use information about the user's network connection by identifying an approximate geographic location for the user from the IP address corresponding to the user's client device (e.g., personal computer, mobile phone). User location can also be determined by other suitable methods, such as GPS, cell phone tower, or Wi-Fi access point signals, or the like. Again, users may be provided with an opportunity to control whether programs or features collect such user information, store it, and utilize it.

Additionally or alternatively, the system can infer the user location from the location of the search engine accessed by the user. For example, if the user provides a search query to an engine located in Italy (e.g., www.google.it) the system infers that the user location is Italy. The system can specifically query the user to provide location information or can access user profiles or accounts containing location information. The system can also infer a location from the user's language preferences (e.g., operating system language settings, the language of the search engine, or the language of the search query).

Signals can also include hostname ownership or registration information. In some implementations, the system 150 identifies locations corresponding to the ccTLD names of documents. For example, the hostname corresponding to www.random.ca includes a country code top-level document ("ccTLD") name (.ca), which is a static signal identifying the location of Canada. In other implementations, the system 150 accesses a database (e.g., using a protocol such as WHOIS) to determine the owner of a hostname. The system 150 can infer a location for the document corresponding to the location of the registrant entity, e.g., the entity's area of incorporation or principal place of business, based on this signal. If the registrant of www.random.ca is listed as having an address in Toronto, for example, the system can identify Toronto as a relevant location. Similarly, the system 150 can infer a location based on business data such as a business address found in a business database.

The system 150 determines scores for the documents 130 using the signals associated with the documents. The system 150 can determine scores for the documents according to various heuristics, as described in greater detail below.

A first score can be calculated for each of two or more first geographic regions. Each first score can be based on one or more first signals, the one or more first signals providing a measure of inferred association between the document and each of the first geographic regions. A second score can be calculated for each of two or more second geographic regions. The second geographic regions are contained within one of the first geographic regions. Each second score can be based on one or more second signals, the one or more second signals providing a measure of inferred association between the document and each of the second geographic regions.

Figure 2:
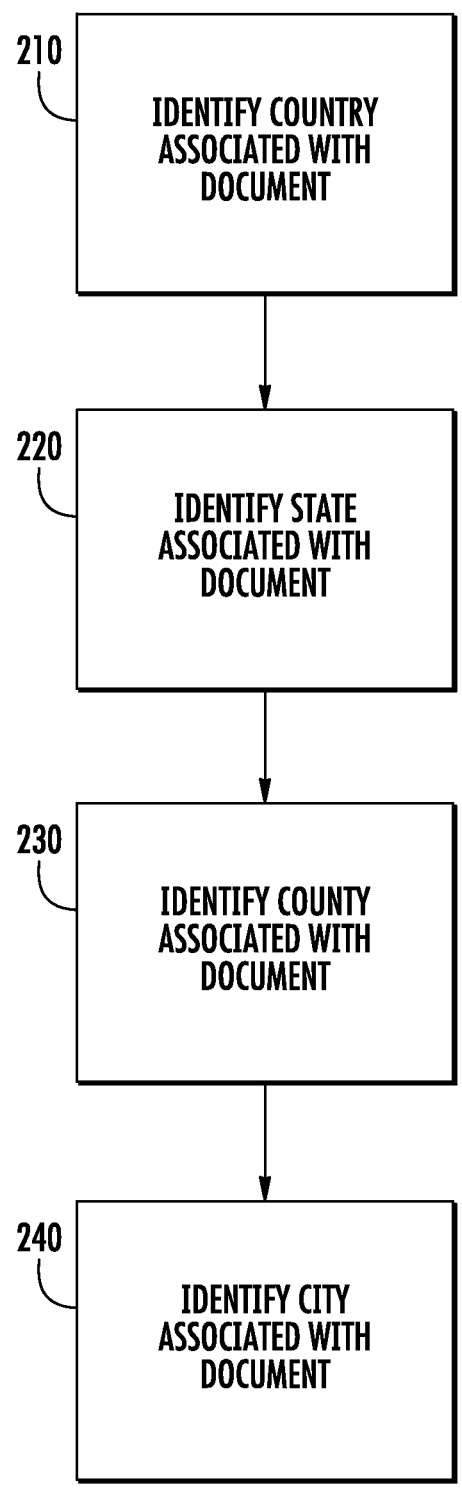
FIG. 2 depicts an exemplary flow according to exemplary embodiments of the present disclosure.

Referring to FIG. 2, the flow of an exemplary method 200 in accordance with the present disclosure is illustrated. At 210 the method includes identifying a country associated with the document. In order to identify a country associated with the document, a number of countries relevant to the document are determined, and a score is calculated for each of those countries based on certain signals. The signals utilized in the exemplary implementation are:

1) Locations in user queries for which the document was responsive, where the document was subsequently clicked when presented as a search result;

2) Locations of users who are clicking on documents; and

3) Locations of businesses identified in the documents, particular when the documents are the business home pages.

The countries are sorted based on the signal scoring. If only a single country is relevant, the document may be geocoded to that country if the country's score is sufficiently high. If multiple countries are relevant to a document, and there is a sudden drop in score from one country to another, then the document may be geocoded to all countries before that drop, especially if the scores of the countries before the drop are above a threshold.

If the document can be geocoded to at least one country, at 220 the next step attempts to identify a state (or province) from that country to which the document can be geocoded. As is described herein, for every state that is relevant to the document a score is calculated and states are sorted based on score. In the presently described implementation, only signals from the country to which the document is geocoded are used to score the states that are relevant to the document. However, it should be appreciated that any suitable signal(s) as described herein can be utilized. If there is a sudden drop in score from one state to another, then the document can be geocoded to all states before that drop, especially if the scores for those states are above a threshold score.

If the document can be geocoded to at least one state, at 230 the system similarly attempts to identify a region (like a county) from that state to which the document can be geocoded, and if a county is assigned, then at 240 the system tries to find a city or sub-city (e.g., Manhattan) in that county to which the document can be geocoded.

In this manner, starting from a country, the system iteratively attempts to zoom down and geocode the document up to sub-city level geographical regions (also referred to as geo-target). At every step, the signals coming from locations outside the higher level location to which the document has already been geocoded (for example from users outside the geo-target state) is filtered out. This provides better precision for classification at the lower level. For example, when trying to find a county within a state, clicks only from that state are considered.

The present disclosure can also optionally discard false positives for a location found in user queries and deemed to be relevant to a document by cross checking what fraction of users from or near that location are clicking on the document.

In certain exemplary aspects of the present disclosure, an iterative algorithm to find the geographic region of a document can be utilized. The algorithm leverages the hierarchical nature of geographic locations. For each document, the following signals can be input:

1. Locations of users who clicked on the document from a search results page;
2. Locations in user queries for which the document was returned, where the document was subsequently clicked when presented as a search result;
3. Whether the document identifies or represents a business, and if yes, in which city (using data from a local search index, or other suitable source as described herein).

For every state the following is calculated for a given document (while the algorithm as described herein does not identify a country, it is assumed for purposes of the present example that one or more countries have already been located as already described herein):

clicks_frac: number of clicks from users from the state/total clicks to the document;

normalized_clicks: number of clicks from users from the state/total clicks to all documents from this state;

norm_clicks_frac: normalized_clicks for this state/sum of normalized clicks for all states for this document;

clicks_score:=(clicks_frac+norm_clicks_frac)/2;

loc_clicks: number of clicks for queries which contained this state or any location from this state;

loc_clicks_frac: loc_clicks/total clicks to this document when query contained any location;

squash_factor_for_loc_clicks: A number between 0 and 1 to squash down the loc_clicks (described further herein);

squashed_loc_clicks:
=squash_fractor_for_loc_clicks*loc_clicks squashed_loc_clicks_frac:=squashed_loc_clicks for this state/sum of squashed_loc_clicks for all states;

final_score:=(clicks_frac+norm_clicks_frac+ (LOC_CLICKS_WEIGHT*squash_loc_clicks_frac))/ (2LOC_CLICKS_WEIGHT)

Where LOC_CLICKS_WEIGHT=4*sqrt(loc_query_click_frac_for_doc)

Where loc_query_click_frac_for_doc=total clicks to the document for queries have any location/total clicks to the document.

Occasionally the locations found in user queries are misleading. For example if a user from Mountain View, Calif. searches for "pizza chicago" and clicks on www.pizzachicago.com (which is a pizza restaurant located in Palo Alto, Calif., very close to Mountain View), then the term "chicago" in the query does not mean the city Chicago, Ill. To discard such false positives for locations in queries, the algorithm looks at the clicks_score to see if users from that state are actually clicking on the document.

The algorithm is: if (clicks_score>predetermined value a)
squash_factor_for_loc_clicks=predetermined value b
else if (clicks_score>predetermined value c)
squash_factor_for_loc_clicks is between 1 and 0//Linearly decreases from 1 to 0 when clicks_score decreases from predetermined a to predetermined c.
else//clicks score<predetermined c
squash_factor_for_loc_clicks=0

The final_score of all states lies between 0 and 1. The states are sorted in decreasing order of scores. If the drop between any 2 consecutive states is large (>predetermined d), then all states before that drop are assigned to the document. Predetermined a-d are calculated based on large samples of documents.

If the previous step successfully finds one or more states to which the document can be geocoded, then one or more cities or subcity level locations (like Manhattan) are attempted to be assigned from those states. If a city/subcity is found, then it is considered the geotarget area of the document, otherwise the states assigned by the previous step are considered the geotarget area of the document. In this step all clicks and locations which are outside the geotarget states calculated in the previous step are discarded.

For every city/subcity location, the following is calculated:
loc_clicks_frac: number of clicks from the location/total clicks from the geotarget states.
business_location_boost:
=predetermined e if the document is for a business entity and this location is the address of that business
=0 otherwise
final_score:
=(loc_clicks_frac+business_location_boost)/(1+business_page_boost) where business_page_boost=predetermined e if the page is about a business in the geotarget state
=0 otherwise All locations which get final_score>=predetermined f are assigned to the document, i.e., the document is geocoded to those locations.

Again, as described herein, predetermined a-f can be any suitable values as can be determined based on the level of precision desired. For example, in certain embodiments, predetermined a can have a value of 0.15, predetermined b can have a value of 1.0, predetermined c can have a value of 0.05, predetermined d can have a value of 0.40, and predetermined e can have a value of 0.6.

The various formulas provided in the above algorithm for scoring documents are exemplary, and variations and other scoring algorithms can be used and are contemplated by the present disclosure. For example, variations include calculating the final score for state identification using only clicks_frac, or using clicks_fracs and norm_clicks without the squash factor.

Irrespective of the scoring algorithm utilized, documents can be geolocated in a hierarchical manner. A high level location or locations (e.g., country) are identified using a scoring function that scores the location based on one or more signals that associate the location(s) with the document. Signals from outside of the identified high level location(s) are then discarded. A lower level (e.g., state) location or locations are then identified using a scoring function that scores the lower level locations using only those signals from the identified higher level location. If a lower level location is identified, signals from outside this location are discarded. An even lower level location (e.g., city) or locations are then identified by scoring the lower level locations using only signals from the intermediate (e.g., state level) location. In this manner, scores for a document indicate the degree to which that document is relevant to a particular location, as established by the signals of the document. The document can be geocoded to locations having sufficiently high location scores, and indexed in a local search index according to those locations.

Referring again to FIG. 1, the system 150 includes a search engine that provides an ordered listing of results in response to search queries received from the client 110. Each result can include, for example, a title, anchor text, and a URL identifying a particular document. Each result also corresponds to a particular document identified by the hostname in the URL.

The system 150 determines location scores for results within the ordered listing of results, i.e., determines location scores for documents corresponding to the results, and stores the determined location scores. In some implementations, the system 150 determines location scores in real time as search results for a query are provided. In other implementations, the system 150 determines location scores offline, e.g., prior to or non-responsive to a particular user query. The system 150 can store the location scores in a searchable index such that, for a given document, the system 150 can use the index to identify location scores for the document. The index can be implemented as any appropriate data structure.

In some implementations, the system 150 promotes one or more results within the ordered listing of results based on the geographic location associated with the document. In this way, the system 150 can present results that a user may consider to be more interesting at a higher position within the ordered listing of results. For example, the system 150 can promote results corresponding to documents having high location scores for the user's location or to documents that have been geocoded to such locations.

In some implementations, the system 150 demotes one or more results within the ordered listing of results. In this way, the system can decrease the number of results presented to a user that the user may find less interesting or overly cumulative. The system 150 can demote results corresponding to documents having low scores for the user's location or that have not been geocoded to the user's location.

The system 150 reorders the listing of results based on any promotions and demotions and presents the reordered results to the client 110.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for location identification, the method comprising:
   identifying, with one or more computing devices, a document;
   calculating, with the one or more computing devices, a first score for each of two or more first geographic regions, each first score being based on one or more first signals, the one or more first signals providing a measure of inferred association between the document and each of the first geographic regions; and
   calculating, with the one or more computing devices, a second score for each of two or more second geographic regions identified based on the first score for each of two or more first geographic regions, the second geographic regions being contained within one of the first geographic regions, each second score being based on one or more second signals, the one or more second signals providing a measure of inferred association between the document and each of the second geographic regions.

2. The computer-implemented method of claim 1, wherein each first score is used to infer an association between the document and one of the first geographic regions.

3. The computer-implemented method of claim 1, wherein each second score is used to infer an association between the document and one of the second geographic regions.

4. The computer-implemented method of claim 1, wherein the document is identified in response to a search query and is selected by a user.

5. The computer-implemented method of claim 4, wherein at least one of the one or more first signals comprises a location in the search query.

6. The computer-implemented method of claim 4, wherein at least one of the one or more first signals comprises a location corresponding to the location of the user selecting the document.

7. The computer-implemented method of claim 1, wherein at least one of the one or more first signals comprises a location of a business identified in the document.

8. The computer-implemented method of claim 1, further comprising geocoding the document based on each first score and each second score.

9. The computer-implemented method of claim 8, further comprising promoting the document in a search query based on the geocoding.

10. The computer-implemented method of claim 8, further comprising demoting the document in a search query based on the geocoding.

11. The computer-implemented method of claim 1, further comprising calculating, with the one or more computing devices, a third score for each of two or more third geographic regions, the third geographic regions being contained within one of the second geographic regions, each third score being based on one or more third signals, the one or more third signals providing a measure of inferred association between the document and each of the third geographic regions.

12. A computing system, comprising:
    at least one processor; and
    at least one memory, the at least one memory storing computer-readable instructions that when executed by the at least one processor cause the processor to perform operations, the operations comprising:
    receiving a user search query via a network interface;
    identifying a document responsive to the user search query;
    receiving a user input via the network interface representative of user selection of the document;
    calculating a first score for each of two or more first geographic regions, each first score being based on one or more first signals, the one or more first signals providing a measure of inferred association between the document and each of the first geographic regions;
    calculating a second score for each of two or more second geographic regions identified based on the first score for each of two or more first geographic regions, the second geographic regions being contained within one of the first geographic regions, each second score being based on one or more second signals, the one or more second signals providing a measure of inferred association between the document and each of the second geographic regions; and
    geocoding the document based on each first score and each second score.

13. The computing system of claim 12, wherein at least one of the one or more first signals comprises a location in the search query.

14. The computing system of claim 12, wherein at least one of the one or more first signals comprises a location corresponding to the location of the user selecting the document.

15. The computing system of claim 12, wherein at least one of the one or more first signals comprises a location of a business identified in the document.

16. A computer-implemented method for location identification, the method comprising:
    identifying a document;
    calculating, with one or more computing devices, a first score for each of two or more first geographic regions, each first score being based on one or more first signals, the one or more first signals providing a measure of inferred association between the document and each of the first geographic regions;

calculating, with the one or more computing devices, a second score for each of two or more second geographic regions identified based on the first score for each of two or more first geographic regions, the second geographic regions being contained within one of the first geographic regions, each second score being based on one or more second signals, the one or more second signals providing a measure of inferred association between the document and each of the second geographic regions geocoding the document based on each first score and each second score.

17. The computer-implemented method of claim 16, further comprising promoting the document in a search query based on the geocoding.

18. The computer-implemented method of claim 16, further comprising demoting the document in a search query based on the geocoding.

19. The computer-implemented method of claim 16, wherein at least one of the one or more first signals comprises a keyword identified in the document.

20. The computer-implemented method of claim 19, wherein the keyword identifies a geographic region.

* * * * *